United States Patent
Yui et al.

(10) Patent No.: US 11,677,066 B2
(45) Date of Patent: Jun. 13, 2023

(54) ANODE MATERIAL AND METHOD FOR PRODUCING THE SAME

(71) Applicant: TOYOTA JIDOSHA KABUSHIKI KAISHA, Toyota (JP)

(72) Inventors: Yuhki Yui, Zama (JP); Hideyuki Yamamura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 17/020,976

(22) Filed: Sep. 15, 2020

(65) Prior Publication Data

US 2021/0091371 A1    Mar. 25, 2021

(30) Foreign Application Priority Data

Sep. 25, 2019 (JP) .............................. JP2019-174581

(51) Int. Cl.
| | |
|---|---|
| *H01M 4/136* | (2010.01) |
| *H01M 4/1397* | (2010.01) |
| *H01M 4/1393* | (2010.01) |
| *H01M 4/133* | (2010.01) |
| *H01M 10/0525* | (2010.01) |
| *H01M 10/0562* | (2010.01) |

(52) U.S. Cl.
CPC ........... *H01M 4/136* (2013.01); *H01M 4/133* (2013.01); *H01M 4/1393* (2013.01); *H01M 4/1397* (2013.01); *H01M 10/0525* (2013.01); *H01M 10/0562* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0239905 | A1* | 9/2010 | Wang | C08K 3/32 252/502 |
| 2018/0351198 | A1* | 12/2018 | Zhamu | H01M 4/625 |

FOREIGN PATENT DOCUMENTS

JP        2010-219051 A     9/2010

OTHER PUBLICATIONS

M. Nagao et al.; "All-Solid-State Lithium Secondary Batteries With High Capacity Using Black Phosphorus Negative Electrode;" Journal of Power Sources; 2011; vol. 196; pp. 6902-6905.

\* cited by examiner

*Primary Examiner* — Ula C Ruddock
(74) *Attorney, Agent, or Firm* — Oliff PLC

(57) ABSTRACT

To provide an anode material configured to increase the reversible capacity of lithium ion secondary batteries, and a method for producing the anode material. The anode material is an anode material for lithium ion secondary batteries, comprising a P element and a C element and being in an amorphous state.

4 Claims, 6 Drawing Sheets

×3000
BF

×3000
SEM

ANODE MATERIAL AND METHOD FOR PRODUCING THE SAME

TECHNICAL FIELD

The disclosure relates to an anode material and a method for producing the anode material.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

For the purpose of developing a high-capacity lithium ion secondary battery, it has been discussed to use phosphorus as an anode active material. Non-Patent Literature 1 discloses an all-solid-state battery which contains an anode material containing Li, P, S and C elements and in which black phosphorus is used as an anode active material.

Non-Patent Literature 1: M Nagao, et al., Journal of Power Sources 196 (2011) 6902-6905

According to Non-Patent Literature 1, a further increase in reversible capacity can be expected considering the theoretical capacity of the case where the charge capacity after initial charging is about 1700 mAh/g and phosphorus is used as the anode active material.

SUMMARY

The disclosed embodiments were achieved in light of the above circumstances. An object of the disclosed embodiments is to provide an anode material for lithium ion secondary batteries, which is configured to increase the reversible capacity of lithium ion secondary batteries. Another object of the disclosed embodiments is to provide a method for producing the anode material.

In a first embodiment, there is provided an anode material for lithium ion secondary batteries, comprising a P element and a C element and being in an amorphous state.

The anode material of the disclosed embodiments may further comprise at least one of a Li element and an S element.

The anode material of the disclosed embodiments may be such that a diffraction peak derived from raw materials is not present in a spectrum obtained by XRD measurement.

In the anode material of the disclosed embodiments, a content of a carbon material containing the C element may be 30 mass % or more.

In another embodiment, there is provided an all-solid-state lithium ion secondary battery comprising a cathode layer, an anode layer and a solid electrolyte layer disposed between the cathode layer and the anode layer, wherein the anode layer contains the anode material.

In another embodiment, there is provided a method for producing an anode material for lithium ion secondary batteries, the method comprising preparing a phosphorus material and a carbon material, and amorphizing the phosphorus material and the carbon material.

For the method for producing the anode material of the disclosed embodiments, in the preparing, a first raw material composition containing the phosphorus material and the carbon material nay be prepared by nixing the phosphorus material and the carbon material, and in the amorphizing, mechanical milling may be carried out on the first raw material composition at a grinding energy of 3.07 B $10^{11}$ kJ×sec/g or more.

For the method for producing the anode material of the disclosed embodiments, in the preparing, at least one selected from the group consisting of a lithium material, a sulfur material and a lithium-sulfur material may be further prepared, and in the amorphizing, the phosphorus material, the carbon material and the at least one selected from the group consisting of the lithium material, the sulfur material and the lithium-sulfur material, may be amorphized.

For the method for producing the anode material of the disclosed embodiments, in the preparing, a second raw material composition containing the phosphorus material, the carbon material and the at least one of the lithium material, the sulfur material and the lithium-sulfur material, may be prepared by mixing the phosphorus material, the carbon material, and the at least one selected from the group consisting of the lithium material, the sulfur material and the lithium-sulfur material, and in the amorphizing, mechanical milling nay be carried out on the second raw material composition at a grinding energy of 3.07 B $10^{11}$ kJ×sec/g or more.

According to the disclosed embodiments, an anode material configured to increase the reversible capacity of lithium ion secondary batteries, and a method for producing the anode material, are provided.

BRIEF DESCRIPTION OF THE DRAWINGS

In the accompanying drawings.

DETAILED DESCRIPTION

A. Anode Material

Figure 1:
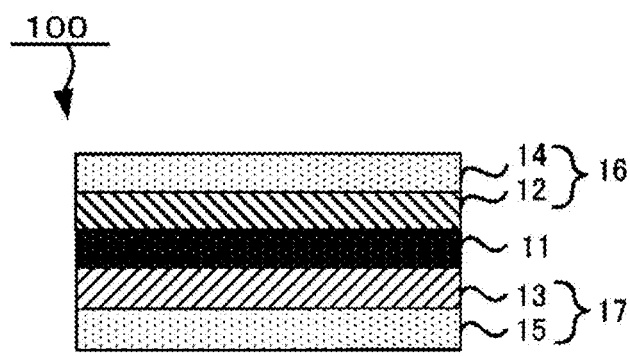
FIG. 1 is a schematic sectional view of an example of an all-solid-state lithium ion secondary battery used in the disclosed embodiments.

In the disclosed embodiments, an anode material for lithium ion secondary batteries, comprising a P element and a C element and being in an amorphous state, is provided.

In the disclosed embodiments, the term 'raw material means a raw material for the anode material, which is a phosphorus material, a carbon material or at least one selected from the group consisting of a lithium material, a sulfur material and a lithium-sulfur material.

Also in the disclosed embodiments, the term 'raw material composition is a composition obtained by mixing the raw materials and encompasses a first raw material composition obtained by nixing the phosphorus material and the carbon material and a second raw material composition obtained by mixing the phosphorus material, the carbon material and the at least one selected from the group consisting of the lithium material, the sulfur material and the lithium-sulfur material.

It was found that the reversible capacity of a lithium ion secondary battery is increased by incorporating, in the battery, an anode material comprising a P element and a C element and being in an amorphous state. The reason is thought as follows. When the anode material is in the amorphous state, the phosphorus material and carbon material contained in the anode material are uniformly dispersed; therefore, a conductive path in the anode material is optimized, thereby enhancing the reversibility of lithium dissolution and deposition.

1. P Element

The anode material contains a P element.

The P element derives from the phosphorus material used as a raw material. The phosphorus material is not particularly limited, as long as it is a material containing a P element. As the phosphorus material, examples include, but are not limited to, an elemental phosphorus. The elemental phosphorus may be at least one allotrope selected from the group consisting of white phosphorus (yellow phosphorus), red phosphorus, violet phosphorus and black phosphorus.

In the disclosed embodiments, the phosphorus material functions as an anode active material.

The amount of the phosphorus material contained in the anode material is not particularly limited and may be appropriately determined depending on desired battery performance. For example, the content of the phosphorus material may be 10 mass % or more and 80 mass % or less of the total mass of the anode material. The lower limit of the content may be 15 mass % or more, 20 mass % or more, or 25 mass % or more. The upper limit of the content may be 70 mass % or less, or it may be 60 mass % or less. If the content of the phosphorus material is too large, the ion conductivity and electron conductivity of the anode layer of the lithium ion secondary battery may be insufficient.

2. C Element

The anode material contains a C element.

The C element derives from the carbon material used as a raw material. The carbon material is not particularly limited, as long as it is a material containing a C element. As the carbon material, examples include, but are not limited to, vapor-grown carbon fiber (VGCF), acetylene black, activated carbon, furnace black, carbon nanotube, Ketjen Black and graphene. As the carbon material, a mixture of two or more kinds of carbon materials may be used.

The carbon material functions as a conductive additive to increase the electron conductivity of the anode material.

The amount of the carbon material contained in the anode material is not particularly limited and may be appropriately determined depending on desired battery performance. For example, the content of the carbon material may be 5 mass % or more and 50 mass % or less of the total mass of the anode material. The lower limit of the content may be 30 mass % or more. The upper limit of the content may be 40 mass % or less. If the content of the carbon material is too large, the content of the phosphorus material is relatively small, and the capacity of the anode material may be insufficient.

3. Li Element

The anode material may further contain a Li element. The Li element derives from the lithium material used as a raw material. The lithium material is not particularly limited, as long as it is a material containing a Li element. As the lithium material, examples include, but are not limited to, $Li_2S$, $Li_2O$, LiF, LiCl, LiBr, LiI and $Li_xMO_y$ (where x and y are positive numbers, and M is P, Si, Ge, B, Al, Ga or In).

The amount of the lithium material contained in the anode material is not particularly limited and may be appropriately determined depending on desired battery performance.

4. S Element

The anode material may further contain an S element. The S element derives from the sulfur material used as a raw material. The sulfur material is not particularly limited, as long as it is a material containing an S element. As the sulfur material, examples include, but are not limited to $P_2S_5$, $GeS_2$, $SiS_2$ and $B_2S_3$.

The amount of the sulfur material contained in the anode material is not particularly limited and may be appropriately determined depending on desired battery performance.

5. Li Element and S Element

Since the reversible capacity of the lithium ion secondary battery can be further increased, the anode material may contain both the Li element and the S element. The Li element and the S element may derive from a mixture of the lithium material and the sulfur material, or they may derive from the lithium-sulfur material.

The lithium-sulfur material is not particularly limited, as long as it contains both the Li element and the S element. As the lithium-sulfur material, a material known to function as a solid electrolyte, may be used. As the lithium-sulfur material, examples include, but are not limited to, $Li_2S$, $Li_2S$—$P_2S_5$, $Li_2S$—$P_2S_5$—LiI, $Li_2S$—$P_2S_5$—$GeS_2$, $Li_2S$—$P_2S_5$—$Li_2O$, $Li_2S$—$P_2S_5$—$Li_2O$—LiI, $Li_2S$-$P_2S_5$—LiI—LiBr, $Li_2S$—$SiS_2$, $Li_2S$—$SiS_2$—LiI, $Li_2S$—$SiS_2$—LiBr, $Li_2S$—S—$SiS_2$—LiCl, $Li_2S$—S—$SiS_2$—$B_2S_3$—LiI, $Li_2S$—S—$SiS_2$—$P_2S_5$—LiI, $Li_2S$—$B_2S_3$, $Li_2S$-$P_2S_5$—ZnSn (where m and n are positive numbers, and Z is Ge, Zn or Ga), $Li_2S$—$GeS_2$, $Li_2S$—S—$SiS_2$—$Li_3PO_4$, and $Li_2S$—S—$SiS_2$—$Li_xMO_y$ (where x and y are positive numbers, and M is P, Si, Ge, B, Al, Ga or In).

These lithium-sulfur materials may be used solely or in combination of two or more. In the case of using two or more lithium-sulfur materials, they may be nixed.

The amount of the mixture of the lithium material and sulfur material contained in the anode material or the amount of the lithium-sulfur material contained therein is not particularly limited and may be appropriately determined depending on desired battery performance. For example, the content of the mixture or the lithium-sulfur material nay be 10 mass % or more and 80 mass % or less of the total mass of the anode material. The lower limit of the content nay be 15 mass % or more, 20 mass % or more, or 30 mass % or more. The upper limit of the content may be 70 mass % or less, or 60 mass % or less. If the content of the mixture or the lithium-sulfur material is too large, the content of the phosphorus material is relatively small, and the capacity of the anode material may be insufficient.

6. Others

As needed, the anode material of the disclosed embodiments may contain other materials such a binder.

As the binder, examples include, but are not limited to, acrylonitrile-butadiene rubber (ABR), butadiene rubber (BR), polyvinylidene fluoride (PVdF) and styrene-butadiene rubber (SBR). The content of the binder in the anode material is not particularly limited.

7. Anode Material 7-1. State of Anode Material

The state of the anode material may be an amorphous state. For example, the anode material is determined to be in the amorphous state when a diffraction peak is not present in a range of 2::=10 é to 30 é of a spectrum obtained by X-ray diffraction (XRD) measurement. Also, the anode material is determined to be in the amorphous state when there is no peak in a range of from 300 $cm^1$ to 500 $cm^1$ of its spectrum obtained by Raman spectroscopy measurement.

7-2. Dispersibility of Anode Material

The dispersibility of the anode material may be evaluated by the following method, for example.

Energy dispersive X-ray spectroscopy (EDS) elemental mapping is carried out in the following measurement condition: an accelerating voltage of 15 kV and PK one line. Accordingly, a scanning electron microscope (SEM) image at 3000-fold magnification (aspect ratio 3:4) is obtained. For the SEM image, the P element and other elements (such as the C, S and Li elements) are multi-valued, and 10 vertical lines and 10 horizontal lines are drawn on the image at regular intervals. The total of the number of times the lines pass through an area corresponding to the P element, may be used as the index of the dispersibility (dispersion index) to evaluate the dispersibility of the anode material.

For the dispersion index of the anode material calculated from the SEM image obtained by the EDS elemental mapping, the lower limit may be 501 or more or may be 1000 or more, and the upper limit is not particularly limited.

7-3. Intended Applications of Anode Material

The anode material of the disclosed embodiments is used in a lithium ion secondary battery. As the lithium ion secondary battery, examples include, but are not limited to, an aqueous lithium ion secondary battery, a non-aqueous lithium ion secondary battery and an all-solid-state lithium ion secondary battery. The term 'secondary battery encompasses the use of the secondary battery as a primary battery (i.e., the case where the secondary battery is charged and discharged only once).

B. Method for Producing Anode Material

According to the disclosed embodiments, a method for producing an anode material for lithium ion secondary batteries is provided, the method comprising preparing a phosphorus material and a carbon material, and amorphizing the phosphorus material and the carbon material.

(1) Preparing

This is a step of preparing a phosphorus material and a carbon material.

In the preparing, a first raw material composition containing the phosphorus material and the carbon material may be prepared by mixing the phosphorus material and the carbon material.

That is, in the preparing, the phosphorus material and the carbon material may be separately prepared, or they may be nixed and prepared as the first raw material composition. The method for mixing the phosphorus material and the carbon material to prepare the first raw material composition, is not particularly limited. For example, they may be mixed by use of a mortar.

As the phosphorus material and the carbon material, examples include, but are not limited to, the phosphorus materials and carbon materials provided above in 'A. Anode material.

In the preparing, as needed, at least one selected from the group consisting of a lithium material, a sulfur material and a lithium-sulfur material may be further prepared. In this case, in the preparing, a second raw material composition containing the phosphorus material, the carbon material and the at least one selected from the group consisting of the lithium material, the sulfur material and the lithium-sulfur material, may be prepared by mixing the phosphorus material, the carbon material, and the at least one selected from the group consisting of the lithium material, the sulfur material and the lithium sulfur material.

That is, in the preparing, the phosphorus material, the carbon material and the at least one selected from the group consisting of the lithium material, the sulfur material and the lithium sulfur material may be separately prepared, or they may be mixed and prepared as the second raw material composition. The method for mixing the phosphorus material, the carbon material and the at least one selected from the group consisting of the lithium material, the sulfur material and the lithium sulfur material to prepare the second raw material composition, is not particularly limited. For example, they may be mixed by use of a mortar.

As the lithium material, the sulfur material and the lithium sulfur material, examples include, but are not limited to, the lithium materials, sulfur materials and lithium sulfur materials provided above in 'A. Anode material, (2) Amorphizing This is a step of amorphizing the phosphorus material and the carbon material. In the preparing, when at least one selected from the group consisting of a lithium material, a sulfur material and a lithium sulfur material is further prepared as a raw material for the anode material, in addition to the phosphorus material and the carbon material, the at least one selected from the group consisting of the lithium material, the sulfur material and the lithium sulfur material, may be amorphized in the amorphizing.

By the amorphizing, the raw materials for the anode material are amorphized, and the dispersibility of the thus-obtained anode material is increased. As a result, the reversible capacity of the lithium ion secondary battery comprising the anode material, is increased.

In the amorphizing, at least the phosphorus material and carbon material prepared in the above-mentioned preparing, which are raw materials for the anode material, may be amorphized, and the amorphization of the raw materials is carried out by a conventionally-known method such as mechanical milling and melt-quenching. From the viewpoint of production cost reduction, mechanical milling may be used.

The raw materials are determined to be in the amorphous state by, for example, the presence or absence of a diffraction peak in a range of 2::=10 é to 30 é of the spectrum obtained by the X-ray diffraction (XRD) measurement, and by the presence or absence of a peak in a range of from 300 $cm^1$ to 500 $cm^1$ of the spectrum obtained by Raman spectroscopy measurement.

When the mechanical milling is carried out in the amorphizing, the mechanical milling may be carried out on the first raw material composition containing the phosphor us material and the carbon material in one step, or it may be carried out as follows: after the mechanical milling is carried out on one of the raw materials (the phosphorus material and the carbon material), the other raw material is added thereto, and then the mechanical milling is carried out on the mixture.

From the viewpoint of reducing the production cost of the lithium ion secondary battery, the mechanical milling may be carried out on the first raw material composition in one step.

When at least one selected from the group consisting of a lithium material, a sulfur material and a lithium-sulfur material is further prepared as a raw material in the preparing and mechanical milling is carried out in the amorphizing, the mechanical milling may be carried out in one step at the predetermined grinding energy on the second raw material composition containing the phosphor us material, the carbon material and the at least one selected from the group consisting of the lithium material, the sulfur material and the lithium sulfur material, or the mechanical milling may be carried out as follows: the raw materials are added in sequence, and the mechanical milling is carried out in several steps at the predetermined grinding energy. In this case, the order of carrying out the mechanical milling on the raw materials, does not natter.

From the viewpoint of reducing the production cost of the lithium ion secondary battery, the mechanical milling may be carried out on the second raw material composition in one step.

The mechanical milling is not particularly limited, as long as it is a method of milling the raw materials or the raw material composition by applying mechanical energy. The mechanical milling may be carried out by a ball mill, a vibrating mill, a turbo mill, mechanofusion, a disk mill or the like. From the viewpoint of ease of the amorphization of the raw materials or the raw material composition, a planetary ball mill may be used.

The mechanical milling uses a grinding medium. As the raw material for the grinding medium examples include, but are not limited to, ceramics, glass and metal.

The mechanical milling nay be dry or wet mechanical milling. Wet mechanical milling uses a liquid, and the liquid is not particularly limited. When at least one selected from the group consisting of the sulfur material and the lithium sulfur material, is contained as a material to be subjected to the mechanical milling, the liquid may be a liquid which is aprotic to the extent that does not generate hydrogen sulfide. As the liquid, examples include, but are not limited to, aprotic liquids such as a polar aprotic liquid and a non-polar aprotic liquid.

A rotor is used to stir the grinding medium disposed inside the container of the mechanical milling device. The rim speed of the rotor nay be in a range of from 5 m/s to 2000 m/s, or in a range of from 628 m/s to 1571 m/s, for example. In general, the rim speed of the rotor means the rim speed of the outer rim of the rotor.

The grinding energy applied to the raw materials or the raw material composition by the mechanical milling device, is defined as follows:

$$\text{Grinding energy} E = (mv^2/2)nt/s$$

where E is the grinding energy; m is the mass (kg) of each grinding medium, v is the rim speed (m/s) of the rotor; n is the number of the grinding medium, t is the mechanical milling time (sec); and s is the mass (g) of the raw materials or the raw material composition.

From the viewpoint of efficiently amorphizing the raw materials or the raw material composition, the lower limit of the grinding energy may be 3.07 B $10^{11}$ kJ×sec/g or more.

The upper limit of the grinding energy is not particularly limited, and it may be 38.4 B $10^{11}$ kJ×sec/g or less, for example.

The condition of the mechanical milling is appropriately determined to obtain the desired anode material. For example, in the case of using the planetary ball mill, the raw materials or the raw material composition and grinding balls are put in the container of the planetary ball mill, and the mechanical milling is carried out at a predetermined plate rotational frequency for a predetermined time. For example, the plate rotational frequency is 200 rpm or more, may be 300 rpm or more, or may be 500 rpm or more. On the other hand, the plate rotational frequency is 800 rpm or less, or it may be 600 rpm or less.

In the case of using the planetary ball mill, the mechanical milling time is 30 minutes or more, for example, or it may be 5 hours or more. On the other hand, the mechanical milling time may be 100 hours or less, for example, or it may be 76 hours or less, or may be 38 hours or less.

As the material for the container and grinding balls used with the planetary ball mill, examples include, but are not limited to, $ZrO_2$ and $Al_2O_3$.

The diameter of the grinding balls may be 1 mm or more and 20 mm or less, for example.

The mechanical milling may be carried out in an inert gas atmosphere such as Ar gas atmosphere.

As needed, the raw material composition may contain other materials such as a binder. The binder may be appropriately selected from the examples of the binder contained in the anode material, which are provided above in 'A. Anode material.

The content of the mixture of the phosphorus material, carbon material, lithium material and sulfur material in the raw material composition or the content of the lithium-sulfur material therein may be the same as the content of the mixture of the phosphorus material, carbon material, lithium material and sulfur material in the anode material described above in 'A. Anode material or the content of the lithium-sulfur material in the anode material described above in 'A. Anode material.

C. All-solid-state lithium ion secondary battery According to the disclosed embodiments, an all-solid-state lithium ion secondary battery comprising a cathode layer, an anode layer and a solid electrolyte layer disposed between the cathode layer and the anode layer, wherein the anode layer contains the anode material, is provided.

FIG. 1 is a schematic sectional view of an example of an all-solid-state lithium ion secondary battery.

As shown in FIG. 1, an all-solid-state lithium ion secondary battery 100 comprises a cathode 16 comprising a cathode layer 12 and a cathode current collector 14, an anode 17 comprising an anode layer 13 and an anode current collector 15, and a solid electrolyte layer 11 disposed between the cathode layer 12 and the anode layer 13.

The cathode layer is a layer containing at least a cathode active material.

The type of the cathode active material is not particularly limited, and any of materials applicable as the active material of the all-solid-state lithium ion secondary battery, may be used. As the cathode active material, examples include, but are not limited to, a lithium (Li) metal, a lithium alloy, $LiCoO_2$, $LiNi_xCo_{1-x}O_2$ (0<x<1), $LiNi_{1/3}Co_{1/3}Mn_{1/3}O_2$, $LiMnO_2$, a different element-substituted Li—Mn spinel (such as $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$ and $LiMn_{1.5}Zn_{0.5}O_4$.), a lithium titanate (such as $Li_4Ti_5O_{12}$), a lithium metal phosphate (such as $LiFePO_4$, $LiHMnPO_4$, $LiCoPO_4$ and LiNi PO$_4$), a lithium compound such as LiCoN, Li$_2$SiO$_3$ and Li$_4$SiO$_4$, a transition metal oxide (such as V$_2$O$_5$ and MoO$_3$), TiS$_2$, P, Si, SiO$_2$ and a lithium storage intermetallic compound (such as Mg$_2$Sn, Mg$_2$Ge, Mg$_2$Sb and Cu$_3$Sb). As the lithium alloy, examples include, but are not limited to, Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te and Li—At.

The form of the cathode active material is not particularly limited. The cathode active material may be in a particulate form.

A coat layer containing a Li ion-conducting oxide nay be formed on the surface of the cathode active material, since a reaction between the cathode active material and the solid electrolyte is suppressed.

As the Li ion-conducting oxide, examples include, but are not limited to, LiNbO$_3$, Li$_4$Ti$_5$O$_{12}$ and Li$_3$PO$_4$. The thickness of the coat layer is 0.1 nm or more, for example, and it may be 1 nm or more. On the other hand, the thickness of the coat layer is 100 nm or less, for example, and it may be 20 nm or less. Also, 70% or more of the surface of the cathode active material is coated with the coat layer, for example, and 90% or more of the surface may be coated with the coat layer.

As needed, the cathode layer may contain at least one of a solid electrolyte, a conductive additive and a binder. The solid electrolyte may be appropriately selected from the examples of the solid electrolyte that may be contained in the below-described solid electrolyte layer. The conductive additive may be appropriately selected from the examples of the carbon material that may be contained in the anode material described above in 'A. Anode material. The binder may be appropriately selected from the examples of the binder that may be contained in the anode material described above in 'A. Anode material.

The thickness of the cathode layer is not particularly limited. For example, it may be 0.1≈m or more and 1000≈m or less.

The cathode layer is easily formed by pressing the cathode active material, etc., for example.

The anode layer comprises the above-described anode material.

The thickness of the anode layer is not particularly limited. For example, it nay be 0.1≈m or more and 1000≈m or less.

The anode layer is easily formed by pressing the above-described anode material, for example.

The solid electrolyte layer is a layer containing at least a solid electrolyte. As needed, it may contain a binder.

As the solid electrolyte, examples include, but are not limited to, a sulfide solid electrolyte, an oxide solid electrolyte, a nitride solid electrolyte and a halide solid electrolyte. The solid electrolyte may be a sulfide solid electrolyte.

The sulfide solid electrolyte may contain a Li element, an A element (A is at least one of P, Ge, Si, Sn, B and Al) and an S element. The sulfide solid electrolyte may further contain a halogen element. As the halogen element, examples include, but are not limited to, an F element, a Cl element, a Br element and an I element. The sulfide solid electrolyte may further contain an O element.

As the sulfide solid electrolyte, examples include, but are not limited to, Li$_2$S—P$_2$S$_5$, Li$_2$S—P$_2$S$_5$—LiI, Li$_2$S—P$_2$S$_5$—GeS$_2$, Li$_2$S—P$_2$S$_5$—Li$_2$O, Li$_2$S—P$_2$S$_5$—Li$_2$O—LiI, Li$_2$S—P$_2$S$_5$—LiI—LiBr, Li$_2$S—S—SiS$_2$. Li$_2$S—S—SiS$_2$—LiI, Li$_2$S—S—SiS$_2$—LiBr, Li$_2$S—S—SiS$_2$—LiCl, Li$_2$S—S—SiS$_2$-B$_2$S$_3$—LiI, Li$_2$S—S—SiS$_2$—P$_2$S$_5$—LiI, Li$_2$S—B$_2$S$_3$, Li$_2$S—P$_2$S$_5$—ZnSn (where m and n are positive numbers, and Z is Ge, Zn or Ga), Li$_2$S-GeS$_2$, Li$_2$S—S—SiS$_2$—Li$_3$PO$_4$ and Li$_2$S—S—SiS$_2$—Li (where x and y are positive numbers, and M is P, Si, Ge, B, Al, Ga or In).

These solid electrolytes may be used solely or in combination of two or more. In the case of using two or more solid electrolytes, they may be mixed, or they may be formed into layers to form a multilayer structure.

The amount of the solid electrolyte contained in the solid electrolyte layer, is not particularly limited. For example, it may be 50 volume % or more, may be 70 volume % or more, or may be 90 volume % or more. The binder used in the solid electrolyte layer may be appropriately selected from the examples of the binder that may be contained in the anode material described above in 'A. Anode material.

The thickness of the solid electrolyte layer is not particularly United. For example, it may be 0.1≈m or more and 1000≈m or less. The solid electrolyte layer is easily formed by pressing the above-described solid electrolyte, etc., for example.

As the material for the cathode current collector, examples include, but are not limited to, SUS, aluminum, nickel, iron, titanium and carbon. As the material for the anode current collector, examples include, but are not limited to, SUS, copper, nickel and carbon.

The form of the cathode current collector and the anode current collector may be a foil form or a mesh form, for example.

As needed, the all-solid-state lithium ion secondary battery comprises an outer casing for housing the cathode, the anode and the solid electrolyte layer.

The material for the outer casing is not particularly United, as long as it is a material stable in electrolytes. As the material, examples include, but are not limited to, metals and resins such as polypropylene, polyethylene and acrylic resins.

As the form of the all-solid-state lithium ion secondary battery, examples include, but are not limited to, a coin form, a laminate form a cylindrical form and a square form.

The method for producing the all-solid-state lithium ion secondary battery of the disclosed embodiments, is not particularly limited. It may be a conventionally-known method.

EXAMPLES

Example 1

[Production of Anode Material Containing P and C elements]
[Preparing]

Red phosphorus and acetylene black were prepared as a phosphorus material and a carbon material, respectively, which were raw materials for the anode material. The phosphorus material and the carbon material were weighed in a mass ratio of 4:3. The raw materials were mixed in an agate mortar for 15 minutes, thereby obtaining a first raw material composition (1.75 g).

[Amorphizing]

The first raw material composition was put in the container (made of ZrO$_2$, 45 cc) of a planetary ball mill. In addition, 500 ZrO$_2$ balls (diameter 4 mm, 57 g) were put in the container. Then, the container was hermetically closed. The container was installed in the planetary ball mill ('P7 manufactured by FRITSCH). Mechanical milling for one hour (plate rotational frequency 500 rpm, rotor rim speed 1571 m/s, grinding energy 2.74 B $10^{12}$ kJ×sec/g), suspension for 15 minutes, mechanical milling in reverse rotation for one hour (plate rotational frequency 500 rpm) and another suspension for 15 minutes were considered as one cycle, and this cycle was repeated to carry out a total of 38 hours of mechanical milling. Accordingly, the anode material containing P and C elements of Example 1 was obtained.
[Production of Evaluation Cell]

As a solid electrolyte, 100 mg of (75(0.75$Li_2S$×0.25$P_2S_5$)×10LiI×15LiBr was put in a 1 $cm^2$ ceramics mold and pressed at 1 ton/$cm^2$ to obtain a solid electrolyte layer. Then, 8 mg (weight per unit area: 8 mg/$cm^2$) of the anode material containing the P and C elements was placed on one side of the layer and pressed at 6 ton/$cm^2$ to produce a working electrode. On the other side of the layer, a lithium-indium alloy foil was disposed as a counter electrode. They were pressed at 1 ton/$cm^2$, thereby obtaining the evaluation battery of Example 1.

Comparative Example 1

The anode material containing P and C elements of Comparative Example 1 was obtained in the same manner as Example 1, except that the amorphizing was not carried out. Then, the evaluation battery of Comparative Example 1 was obtained in the same manner as Example 1.

Example 2

[Production of Anode Material Containing P, C, Li and S Elements]
[Preparing]

Red phosphorus, acetylene black and (75(0.75$Li_2S$×0.25$P_2S_5$)×10LiI×15LiBr were prepared as a phosphorus material, a carbon material and a lithium-sulfur material, respectively, which were raw materials for the anode material. The phosphorus material, the lithium-sulfur material and the carbon material were weighed in a mass ratio of 4:3:3. The raw materials were mixed in an agate mortar for 15 minutes, thereby obtaining a second raw material composition (2.5 g).
[Amorphizing]

The second raw material composition was put in the container (made of $ZrO_2$, 45 cc) of the planetary ball mill. In addition, the 500 $ZrO_2$ balls (diameter 4 mm, 57 g) were put in the container. Then, the container was hermetically closed. The container was installed in the planetary ball mill ('P7 manufactured by FRITSCH). Mechanical milling for one hour (plate rotational frequency 500 rpm, rotor rim speed 1571 m/s, grinding energy 1.92 B $10^{12}$ kJ×sec/g), suspension for 15 minutes, mechanical milling in reverse rotation for one hour (plate rotational frequency 500 rpm) and another suspension for 15 minutes were considered as one cycle, and this cycle was repeated to carry out a total of 38 hours of mechanical milling. Accordingly, the anode material containing P, C, Li and S elements of Example 2 was obtained.
[Production of Evaluation Battery]

As a solid electrolyte, 100 mg of (75(0.75$Li_2S$×0.25$P_2S_5$)×10LiI×15LiBr was put in the 1 $cm^2$ ceramics mold and pressed at 1 ton/$cm^2$ to obtain a solid electrolyte layer. Then, 8 mg (weight per unit area: 8 mg/$cm^2$) of the anode material containing the P, C, Li and S elements was placed on one side of the layer and pressed at 6 ton/$cm^2$ to produce a working electrode. On the other side of the layer, a lithium-indium alloy foil was disposed as a counter electrode. They were pressed at 1 ton/$cm^2$, thereby obtaining the evaluation battery of Example 2.

Comparative Example 2

The anode material containing P, C, Li and S elements of Comparative Example 2 was obtained in the same manner as Example 2, except that the amorphizing was not carried out. Then, the evaluation battery of Comparative Example 2 was obtained in the same manner as Example 2.

Example 3

The anode material containing P, C, Li and S elements of Example 3 was obtained in the same manner as Example 2, except that in the preparing, VGCF was used as the carbon material, in place of acetylene black. Then, the evaluation battery of Example 3 was obtained in the same manner as Example 2.

Example 4

The anode material containing P, C, Li and S elements of Example 4 was obtained in the same manner as Example 2, except that in the amorphizing, the mechanical milling condition was changed as follows: the plate rotational frequency was changed to 200 rpm, the rotor rim speed was changed to 628 m/s; and the grinding energy was changed to 3.07 B $10^{11}$ kJ×sec/g or more. Then, the evaluation battery of Example 4 was obtained in the same manner as Example 2.

Example 5

The anode material containing P, C, Li and S elements of Example 5 was obtained in the same manner as Example 2, except that in the amorphizing, the mechanical milling condition was changed as follows: the plate rotational frequency was changed to 300 rpm, the rotor rim speed was changed to 942 m/s; and the grinding energy was changed to 6.91 B $10^{11}$ kJ×sec/g. Then, the evaluation battery of Example 5 was obtained in the same manner as Example 2.

Example 6

The anode material containing P, C, Li and S elements of Example 6 was obtained in the same manner as Example 2, except that in the amorphizing, the mechanical milling condition was changed as follows: the plate rotational frequency was changed to 400 rpm, the rotor rim speed was changed to 1257 m/s; and the grinding energy was changed to 1.23 B $10^{12}$ kJ×sec/g. Then, the evaluation battery of Example 6 was obtained in the same manner as Example 2.

Comparative Example 3

The anode material containing P, C, Li and S elements of Comparative Example 3 was obtained in the same manner as Example 2, except that in the amorphizing, the mechanical milling condition was changed as follows: the plate rotational frequency was changed to 100 rpm, the rotor rim speed was changed to 314 m/s; and the grinding energy was changed to 0.76 B $10^{11}$ kJ×sec/g. Then, the evaluation battery of Comparative Example 3 was obtained in the same manner as Example 2.

Example 7

[Production of Anode Material Containing P, C, Li and S Element s]
[Preparing]

Red phosphorus, acetylene black and (75(0.75$Li_2S$×0.25$P_2S_5$)×10LiI×15LiBr were prepared as a phosphorus material, a carbon material and a lithium-sulfur material, respectively, which were raw materials for the anode material. The phosphorus material, the lithium-sulfur material and the carbon material were weighed in a mass ratio of 4:3:3 so that the mass of a second raw material composition to be obtained was 2.5 g.

[Amorphizing]

First, a mixture of the carbon material and the lithium-sulfur material was put in the container (made of $ZrO_2$, 45 cc) of the planetary ball mill. In addition, the 500 $ZrO_2$ balls (diameter 4 mm, 57 g) were put in the container. Then, the container was hermetically closed. The container was installed in the planetary ball mill ('P7 manufactured by FRITSCH). Mechanical milling for one hour (plate rotational frequency 500 rpm, rotor rim speed 1571 m/s, grinding energy 1.92 B $10^{12}$ kJ×sec/g), suspension for 15 minutes, mechanical milling in reverse rotation for one hour (plate rotational frequency 500 rpm) and another suspension for 15 minutes were considered as one cycle, and this cycle was repeated to carry out a total of 38 hours of mechanical milling.

Then, the phosphorus material was further added to and mixed with the mixture in the container, thereby obtaining the second raw material composition. The container was hermetically closed again. The container was installed in the planetary ball mil ('P7 manufactured by FRITSCH) again. Mechanical milling for one hour (plate rotational frequency 500 rpm, rotor rim speed 1571 m/s, grinding energy 1.92 B $10^{12}$ kJ×sec/g), suspension for 15 minutes, mechanical milling in reverse rotation for one hour (plate rotational frequency 500 rpm) and another suspension for 15 minutes were considered as one cycle, and this cycle was repeated to carry out a total of 38 hours of mechanical milling again. Accordingly, the anode material containing P, C, Li and S elements of Example 7 was obtained.

[Production of Evaluation Battery]

The evaluation battery of Example 7 was obtained in the same manner as Example 2.

Example 8

[Production of Anode Material Containing P, C, Li and S Elements]

[Preparing]

Red phosphorus, acetylene black and (75(0.75$Li_2$S×0.25$P_2S_5$)×10LiI×15LiBr were prepared as a phosphorus material, a carbon material and a lithium-sulfur material, respectively, which were raw materials for the anode material. The phosphorus material, the lithium-sulfur material and the carbon material were weighed in a mass ratio of 4:3:3 so that the mass of a second raw material composition to be obtained was 2.5 g.

[Amorphizing]

First, the phosphorus material was put in the container (nude of $ZrO_2$, 45 cc) of the planetary ball mill. In addition, the 500 $ZrO_2$ balls (diameter 4 mm, 57 g) were put in the container. Then, the container was hermetically closed. The container was installed in the planetary ball mill ('P7 manufactured by FRITSCH). Mechanical milling for one hour (plate rotational frequency 500 rpm, rotor rim speed 1571 m/s, grinding energy 1.92 B $10^{12}$ kJ×sec/g), suspension for 15 minutes, mechanical milling in reverse rotation for one hour (plate rotational frequency 500 rpm) and another suspension for 15 minutes were considered as one cycle, and this cycle was repeated to carry out a total of 38 hours of mechanical milling.

Then, the carbon material and the lithium-sulfur material were further added to and mixed with the phosphorus material in the container, thereby obtaining the second raw material composition. The container was hermetically closed again. The container was installed in the planetary ball mill ('P7 manufactured by FRITSCH) again. Mechanical milling for one hour (plate rotational frequency 500 rpm, rotor rim speed 1571 m/s, grinding energy 1.92 B $10^{12}$ kJ×sec/g), suspension for 15 minutes, mechanical milling in reverse rotation for one hour (plate rotational frequency 500 rpm) and another suspension for 15 minutes were considered as one cycle, and this cycle was repeated to carry out a total of 38 hours of mechanical milling again. Accordingly, the anode material containing P, C, Li and S elements of Example 8 was obtained.

[Production of Evaluation Battery]

The evaluation battery of Example 8 was obtained in the same manner as Example 2.

TABLE 1

| | Composition (molar ratio) | Grinding energy (kj Xsec/g) | Reversible capacity (mAh/g-P) | Presence or absence of peak | Dispersibility |
|---|---|---|---|---|---|
| Example 1 | $P_{12840}C_{3603}$ | 2.74 B $10^{12}$ | 1891 | Absent | A |
| Example 2 | $Li_{4.5}P_{12841}S_{5.1}C_{3603}$ | 1.92 B $10^{12}$ | 2278 | Absent | A |
| Example 3 | $Li_{4.5}P_{12841}S_{5.1}C_{3603}$ | 1.92 B $10^{12}$ | 2570 | Absent | A |
| Example 4 | $Li_{4.5}P_{12841}S_{5.1}C_{3603}$ | 3.07 B $10^{11}$ | 2503 | Absent | B |
| Example 5 | $Li_{4.5}P_{12841}S_{5.1}C_{3603}$ | 6.91 B $10^{11}$ | 2485 | Absent | B |
| Example 6 | $Li_{4.5}P_{12841}S_{5.1}C_{3603}$ | 1.23 B $10^{12}$ | 2724 | Absent | A |
| Example 7 | $Li_{4.5}P_{12841}S_{5.1}C_{3603}$ | 3.84 B $10^{12}$ | 2539 | Absent | A |
| Example 8 | $Li_{4.5}P_{12841}S_{5.1}C_{3603}$ | 3.84 B $10^{12}$ | 2357 | Absent | B |
| Comparative Example 1 | $P_{12840}C_{3603}$ | 0 | 52 | Present | C |
| Comparative Example 2 | $Li_{4.5}P_{12841}S_{5.1}C_{3603}$ | 0 | 214 | Present | C |
| Comparative Example 3 | $Li_{4.5}P_{12841}S_{5.1}C_{3603}$ | 0.76 B $10^{11}$ | 65 | Present | C |

[XRD Measurement]

XRD measurement was carried out on the anode materials of Examples 1 to 8 and Comparative Examples 1 to 3, the black phosphorus, the red phosphorus, the lithium-sulfur material (75(0.75$Li_2$S×0.25$P_2S_5$)×10LiI×15LiBr) and the acetylene black (AB).

Figure 2:
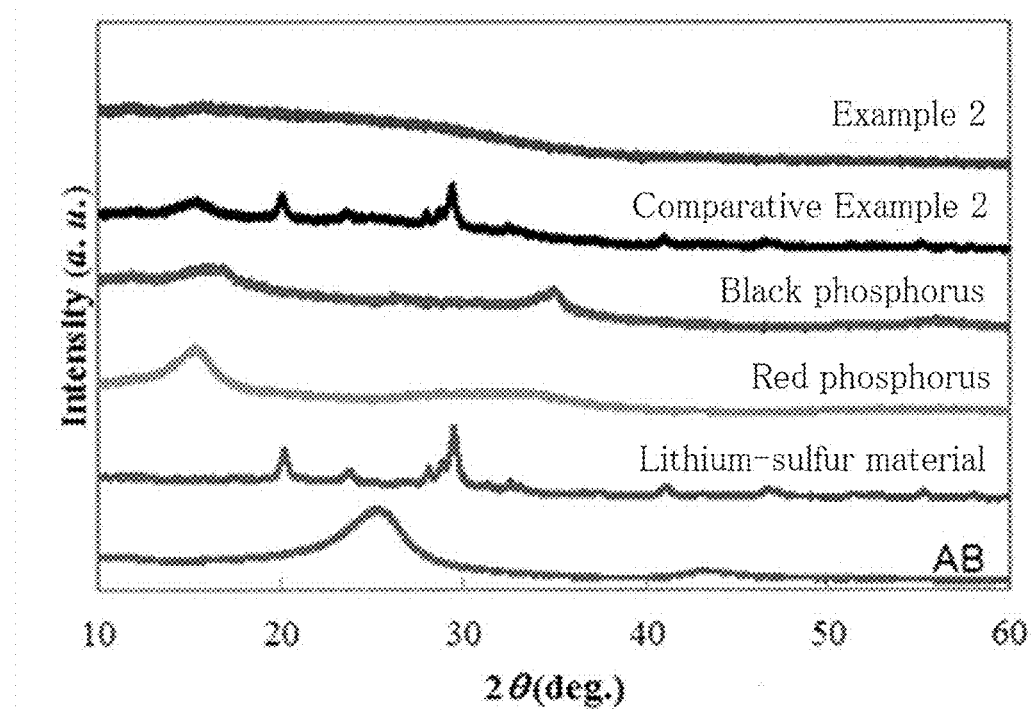
FIG. 2 is a view showing the XRD patterns of the anode material of Example 2, the anode material of Comparative Example 2, black phosphorus, red phosphorus, a lithium-sulfur material ($75(0.75Li_2S×0.25P_2S_5)×10LiI×15LiBr$) and acetylene black (AB)

FIG. 2 is a view showing the XRD patterns of the anode material of Example 2, the anode material of Comparative Example 2, the black phosphorus, the red phosphorus, the lithium-sulfur material (0.75$Li_2$S×0.25$P_2S_5$)×10LiI×15LiBr) and the acetylene black (AB). Table 1 shows the presence or absence of a diffraction peak in a range of 2::=10 é to 30 é for the anode materials of Examples 1 to 8 and Comparative Examples 1 to 3. Like the anode material of Example 2 shown in FIG. 2, the anode material showing no diffraction peak can be said to be an amorphized anode material. Meanwhile, it is clear that like the anode material of Comparative Example 2 shown in FIG. 2, the anode material showing the diffraction peak is not an amorphized anode material, since a similar diffraction peak to the XRD patterns of the red phosphorus and the lithium-sulfur material (75(0.75Li$_2$S×0.25P$_2$S$_5$)×10LiI×15LiBr), which are raw materials, is observed.

[Raman Spectroscopy Measurement]

Raman spectroscopy measurement was carried out on the anode material of Example 2, the anode material of Comparative Example 2, the black phosphorus, the red phosphorus and the lithium-sulfur material (75(0.75Li$_2$S× 0.25P$_2$S$_5$)×10LiI×15LiBr).

Figure 3:
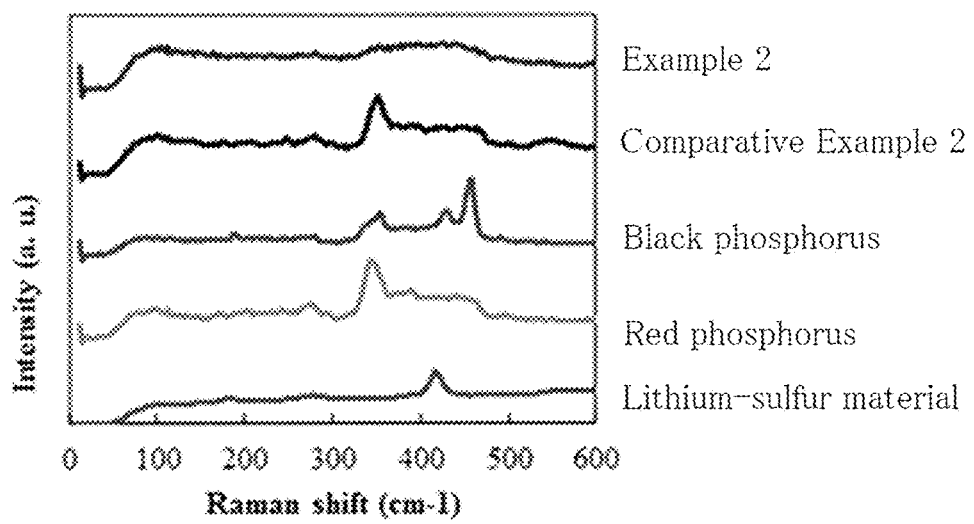
FIG. 3 is a view showing the Raman spectra of the anode material of Example 2, the anode material of Comparative Example 2, the black phosphorus, the red phosphorus and the lithium-sulfur material ($75(0.75Li_2S×0.25P_2S_5)×10LiI×15LiBr$)

FIG. 3 is a view showing the Raman spectra of the anode material of Example 2, the anode material of Comparative Example 2, the black phosphorus, the red phosphorus and the lithium-sulfur material (75(0.75Li$_2$S×0.25P$_2$S$_5$)×10LiI× 15LiBr). For the anode material of Comparative Example 2, a peak derived from the red phosphorus and the framework of PS$_4^{3-}$ is present in a range of from 300 cm$^1$ to 500 cm$^1$. For the anode material of Example 2, it is clear that there is no peak derived from them. This fact is not inconsistent with the XRD measurement results and shows that by the presence or absence of a peak in a range of from 300 cm$^1$ to 500 cm$^1$ of the Raman spectrum, it can be determined whether or not the anode material is in the amorphous state described in the disclosed embodiments.

[EDS]

SEM EDS elemental analysis was carried out on the anode material of Example 2 and the anode material of Comparative Example 2.

Figure 4:
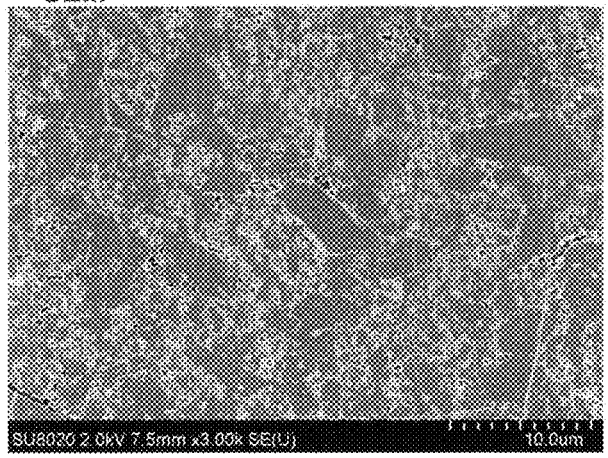
FIG. 4 is a secondary electron image (a SEM image) of the anode material of Example 2.
Figure 5:
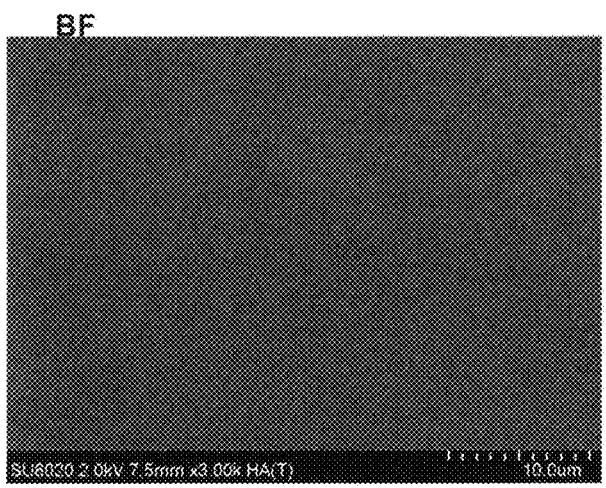
FIG. 5 is a backscattered electron image (a BF image) of the anode material of Example 2.

FIG. 4 is a secondary electron image (a SEM image) of the anode material of Example 2. FIG. 5 is a backscattered electron image (a BF image) of the anode material of Example 2.

Figure 6:
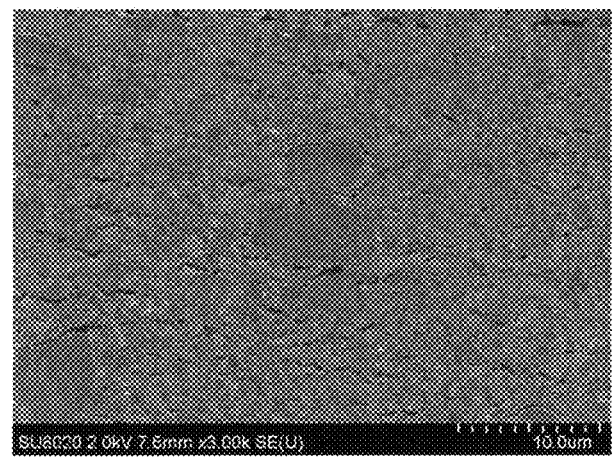
FIG. 6 is a secondary electron image (a SEM image) of the anode material of Comparative Example 2.
Figure 7:
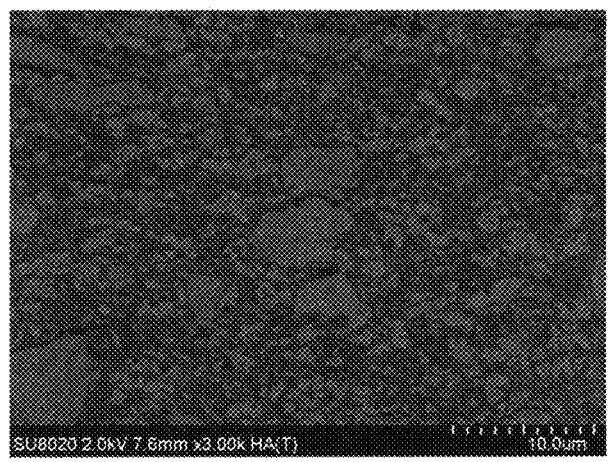
FIG. 7 is a backscattered electron image (a BF image) of the anode material of Comparative Example 2.

FIG. 6 is a secondary electron image (a SEM image) of the anode material of Comparative Example 2. FIG. 7 is a backscattered electron image (a BF image) of anode material of Comparative Example 2.

From the SEM image of the anode material of Comparative Example 2 shown in FIG. 6, the presence of a particle 5≈m or more in size, was confirmed. From the BF image of the anode material of Comparative Example 2 shown in FIG. 7, the particle is different in contrast from other areas. From these facts, it is clear that the composition of the anode material of Comparative Example 2 is present in a non-uniformly distributed manner.

From the SEM image of the anode material of Example 2 shown in FIG. 4, the presence of a particle 5≈m or more in size, was confirmed as well. From the BF image of the anode material of Example 2 shown in FIG. 5, it is clear that there is no contrast and the composition of the anode material is uniform

[Dispersibility]

EDS elemental mapping was carried out on the anode material of Example 2 and the anode material of Comparative Example 2.

Dispersibility evaluation was carried out based on a difference in contrast between images obtained by the EDS elemental mapping. More specifically, the EDS mapping was carried out in the following measurement condition: an accelerating voltage of 15 kV and PK one line. Accordingly, scanning electron microscope (SEM images at 3000-fold magnification (aspect ratio 3:4) were obtained. For each SEM image, the P element and other elements were multi-valued, and 10 vertical lines and 10 horizontal lines were drawn on the image at regular intervals. The total of the number of times the lines passed through an area corresponding to the P element, was used as the index of the dispersibility (dispersion index) to evaluate the dispersibility of the anode material.

Figure 8:
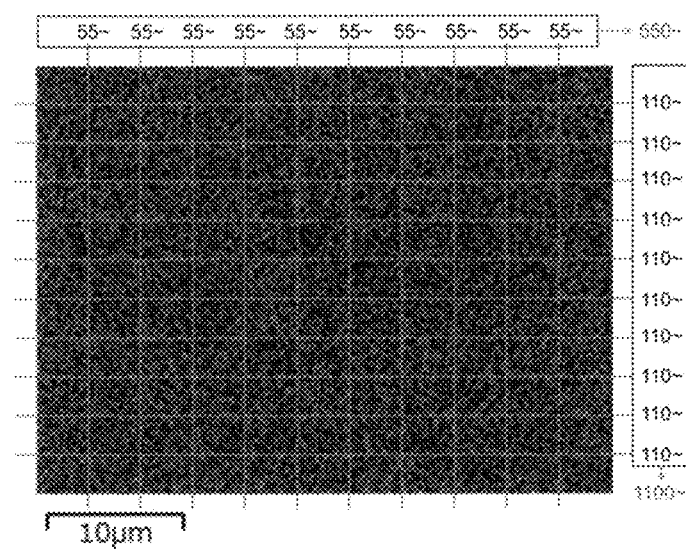
FIG. 8 is an image obtained by EDS mapping of the anode material of Example 2.
Figure 9:
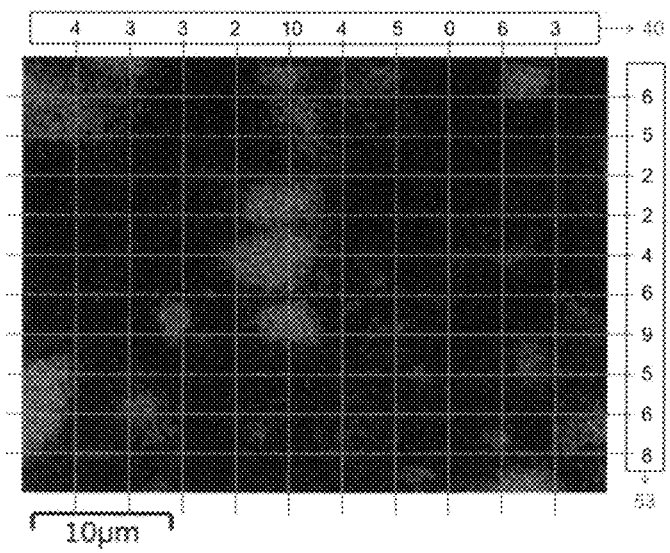
FIG. 9 is an image obtained by EDS mapping of the anode material of Comparative Example 2.

FIG. 8 is an image obtained by EDS mapping of the anode material of Example 2. FIG. 9 is an image obtained by EDS mapping of the anode material of Comparative Example 2.

FIG. 9 shows that for Comparative Example 2, the number of times the vertical lines passed through the area corresponding to the P element, is 40; the number of times the horizontal lines passed through the area corresponding to the P element, is 53; and the dispersion index is 93. FIG. 8 shows that for Example 2, the number of times the vertical lines passed through the area corresponding to the P element, is 550 or more; the number of times the horizontal lines passed through the area corresponding to the P element, is 1100 or more; and the dispersion index is 1650 or more.

The dispersibility evaluation results are shown in Table 1. In Table 1, a dispersion index of from 1 to 500 was evaluated as poor dispersibility and 'C; a dispersion index of from 501 to 1000 was evaluated as good dispersibility and 'B; and a dispersion index of more than 1000 was evaluated as very good dispersibility and 'A. From Table 1, it is clear that the anode materials of Examples 1 to 8 have high dispersibility. This is considered be because, since the anode materials were in the amorphous state, the dispersibility of the anode materials of Examples 1 to 8 was increased.

[Battery Characteristics Evaluation]

A charge-discharge test was carried out for 3 cycles on the evaluation battery obtained in Example 1, in the following condition; a temperature environment of 60èC, a current value of 0.5 (mA/cm$^2$) and a voltage range of from 0 V (vs. Li/Li$^+$) to 1.5 V (vs. Li/Li$^+$).

In the same manner as the evaluation battery obtained in Example 1, the charge-discharge test was carried out on the evaluation batteries obtained in Examples 2 to 8 and Comparative Examples 1 to 3. The capacity calculated from the charge and discharge of the second cycle of each evaluation battery, was determined as reversible capacity. The reversible capacities of the evaluation batteries are shown in Table 1.

Figure 10:
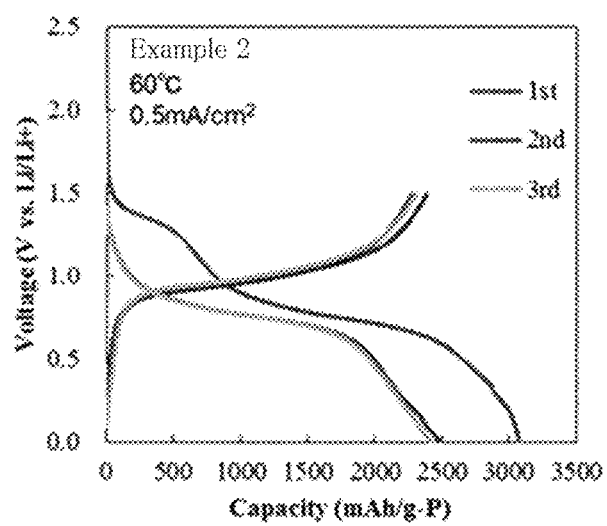
FIG. 10 is a view showing the charge-discharge curves of the evaluation battery of Example 2.
Figure 11:
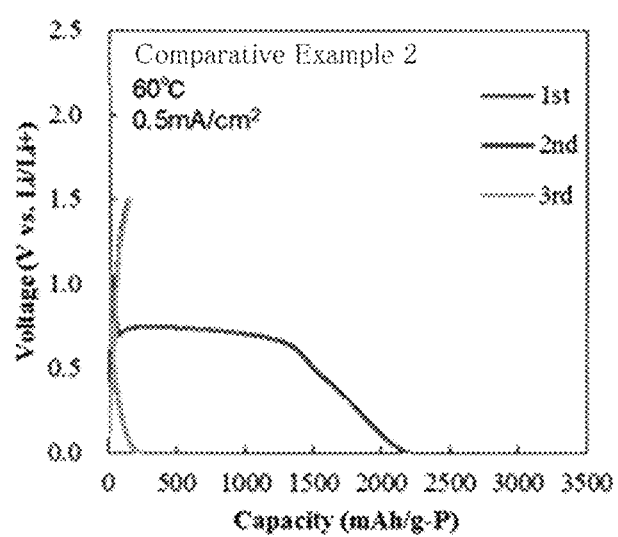
FIG. 11 is a view showing the charge-discharge curves of the evaluation battery of Comparative Example 2.

FIG. 10 is a view showing the charge-discharge curves of the evaluation battery of Example 2. FIG. 11 is a view showing the charge-discharge curves of the evaluation battery of Comparative Example 2. It is clear that while the evaluation battery of Comparative Example 2 obtained the capacity by initial discharge, almost no reversible capacity was obtained. Meanwhile, it is clear that the evaluation battery of Example 2 is large in initial discharge capacity and reversible capacity. As shown in Table 1, it is clear that the evaluation batteries of Examples 1 to 8 are large in reversible capacity compared to the evaluation batteries of Comparative Examples 1 to 3. The reason is considered as follows: since the anode materials used in the evaluation batteries of Examples 1 to 8 were in the amorphous state, the dispersibility of the phosphorus and carbon was increased, and due to the increase in the dispersibility, the conductive path in the anode materials was optimized to increase the reversible capacity of the evaluation batteries.

As shown in Table 1, the evaluation battery of Example 2 is larger than the reversible capacity of the evaluation battery of Example 1. There are possible reasons for this. Since the lithium-sulfur material containing the Li and S elements and having a solid electrolyte function, is included in the raw materials for the anode material, the conductive path in the anode material was optimized, the lithium was pre-doped with the phosphorus, or the P was highly dispersed in the matrix of the lithium-sulfur material, and expansion and contraction, which were attributed to charge and discharge, were suppressed, thereby increasing the reversible capacity of the evaluation battery.

REFERENCE SIGNS LIST

11. Solid electrolyte layer
12. Cathode layer
13. Anode layer
14. Cathode current collect or
15. Anode current collect or
16. Cathode
17. Anode
100. All-solid-state lithium ion secondary battery

The invention claimed is:

1. A method for producing an anode material for lithium ion secondary batteries, the method comprising
preparing a raw material composition containing a phosphorus material, a carbon material and a lithium-sulfur material by mixing the phosphorus material, the carbon material and the lithium-sulfur material, and
amorphizing the raw material composition by carrying out mechanical milling on the raw material composition at a grinding energy of $3.07\times10^{11}$ kJ·sec/g or more and $38.4\times10^{11}$ kJ·sec/g or less.

2. The method for producing the anode material for lithium ion secondary batteries according to claim 1, wherein the mechanical milling is conducted for a time of 5 hours or more and 100 hours or less.

3. The method for producing the anode material for lithium ion secondary batteries according to claim 1, wherein the mechanical milling is conducted for a time of 38 hours.

4. The method for producing the anode material for lithium ion secondary batteries according to claim 1,
wherein the phosphorus material is red phosphorus,
wherein the carbon material is vapor-grown carbon fiber or acetylene black, and
wherein the lithium-sulfur material is $(75(0.75Li_2S.0.25P_2S_5)\cdot10LiI.15LiBr$.

* * * * *